United States Patent
Wakamatsu et al.

(10) Patent No.: US 11,778,040 B2
(45) Date of Patent: Oct. 3, 2023

(54) COMMUNICATION APPARATUS, PROGRAM, COMMUNICATION METHOD, INFORMATION PROCESSING METHOD, INFORMATION PROCESSING APPARATUS, AND COMMUNICATION SYSTEM

(71) Applicant: DAIKIN INDUSTRIES, LTD., Osaka (JP)

(72) Inventors: Kousuke Wakamatsu, Osaka (JP); Kenta Nohara, Osaka (JP); Gou Nakatsuka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/905,198

(22) PCT Filed: Mar. 1, 2021

(86) PCT No.: PCT/JP2021/007747
§ 371 (c)(1),
(2) Date: Aug. 29, 2022

(87) PCT Pub. No.: WO2021/177243
PCT Pub. Date: Sep. 10, 2021

(65) Prior Publication Data
US 2023/0131484 A1 Apr. 27, 2023

(30) Foreign Application Priority Data
Mar. 2, 2020 (JP) .................. 2020-035381

(51) Int. Cl.
*H04L 67/141* (2022.01)
*H04L 69/08* (2022.01)
*H04L 67/12* (2022.01)

(52) U.S. Cl.
CPC ............ *H04L 67/141* (2013.01); *H04L 67/12* (2013.01); *H04L 69/08* (2013.01)

(58) Field of Classification Search
CPC ........ H04L 67/141; H04L 69/08; H04L 67/12
See application file for complete search history.

(56) References Cited

U.S. PATENT DOCUMENTS 8,930,535 B2 * 1/2015 Fertell .................... H04L 41/20
709/225
9,736,003 B1 * 8/2017 Bichot ................ H04L 12/2805
(Continued)

FOREIGN PATENT DOCUMENTS

JP 2008-191878 8/2008
JP 2015-084463 4/2015
(Continued)

OTHER PUBLICATIONS

International Search Report for PCT/JP2021/007747 dated May 25, 2021.
(Continued)

*Primary Examiner* — Jerry B Dennison
(74) *Attorney, Agent, or Firm* — IPUSA, PLLC

(57) ABSTRACT

A communication device including: an acquiring unit configured to transmit first identification information for identifying the communication device to a first connection destination and to acquire information about a second connection destination corresponding to the first identification information; and a transmitter configured to transmit data to the second connection destination.

10 Claims, 7 Drawing Sheets

(56) References Cited

U.S. PATENT DOCUMENTS

| | | | | |
|---|---|---|---|---|
| 10,284,606 B2* | 5/2019 | Bertin | | H04L 67/141 |
| 10,673,646 B1* | 6/2020 | Shinar | | H04L 5/0055 |
| 10,769,000 B1* | 9/2020 | Plunk | | G06F 9/44536 |
| 11,303,541 B2* | 4/2022 | Miedema | | H04L 67/01 |
| 2002/0036794 A1* | 3/2002 | Boehmer | | H04L 69/08 |
| | | | | 358/1.15 |
| 2008/0168118 A1* | 7/2008 | Hickey | | G06F 13/385 |
| | | | | 709/201 |
| 2008/0177888 A1* | 7/2008 | Catalfano | | H04L 69/08 |
| | | | | 709/230 |
| 2009/0292807 A1* | 11/2009 | Liu | | H04L 69/24 |
| | | | | 709/225 |
| 2010/0042233 A1* | 2/2010 | Han | | H04L 12/2809 |
| | | | | 700/90 |
| 2014/0256286 A1* | 9/2014 | Rangarajan | | H04W 12/00 |
| | | | | 455/410 |
| 2014/0379932 A1* | 12/2014 | Bertin | | H04L 69/24 |
| | | | | 709/227 |
| 2015/0009916 A1* | 1/2015 | Wendling | | H04N 21/4367 |
| | | | | 370/329 |
| 2015/0117457 A1* | 4/2015 | Koizumi | | H04W 4/60 |
| | | | | 370/392 |
| 2015/0271257 A1* | 9/2015 | Abramov | | H04N 21/632 |
| | | | | 709/222 |
| 2017/0180277 A1 | 6/2017 | Brady et al. | | |
| 2017/0346654 A1* | 11/2017 | Ma | | H04W 4/50 |
| 2018/0084063 A1* | 3/2018 | Miedema | | H04L 67/51 |
| 2018/0091974 A1* | 3/2018 | Dickens | | G06Q 50/12 |
| 2018/0234494 A1* | 8/2018 | Klemets | | H04W 52/0212 |
| 2019/0245785 A1* | 8/2019 | Haapanen | | H04L 45/74 |
| 2019/0289648 A1* | 9/2019 | Kim | | H04W 8/26 |
| 2023/0046997 A1* | 2/2023 | Gong | | G06F 3/03545 |
| 2023/0061095 A1* | 3/2023 | Lu | | G06F 16/14 |
| 2023/0076249 A1* | 3/2023 | Suh | | H04W 36/0055 |

FOREIGN PATENT DOCUMENTS

| | | |
|---|---|---|
| JP | 2017-046069 | 3/2017 |
| JP | 2017-117445 | 6/2017 |
| JP | 2019-022125 | 2/2019 |

OTHER PUBLICATIONS

International Preliminary Report on Patentability for PCT/JP2021/007747 dated Sep. 15, 2022.

Extended European Search Report for 21764260.2 dated Jul. 7, 2023.

* cited by examiner

FIG.5

| EDGE ID | TYPE | CONNECTION DESTINATION INFORMATION | AUTHENTICATION STATUS | COMMUNICATION DEVICE ID |
|---|---|---|---|---|
| EDGE A | TYPE A | CONNECTION DESTINATION INFORMATION A | AUTHENTICATION STATUS A | COMMUNICATION DEVICE A |
| EDGE B | TYPE B | CONNECTION DESTINATION INFORMATION B | AUTHENTICATION STATUS B | — |
| ... | ... | ... | ... | ... |

| SERVICE MENU | CONNECTION DESTINATION SERVICE | PROTOCOL | FILE FORMAT | CONNECTION DESTINATION ADDRESS |
|---|---|---|---|---|
| REMOTE MONITORING | CONNECTION DESTINATION SERVICE A | https | FILE FORMAT A | CONNECTION DESTINATION ADDRESS A |
| REMOTE CONTROL | CONNECTION DESTINATION SERVICE B | MQTT over WebSoocket | FILE FORMAT A | CONNECTION DESTINATION ADDRESS B |
| ANOMALY DETECTION | CONNECTION DESTINATION SERVICE A | https | FILE FORMAT A | CONNECTION DESTINATION ADDRESS C |
| SCHEDULE CONTROL | CONNECTION DESTINATION SERVICE C | https | FILE FORMAT A | CONNECTION DESTINATION ADDRESS D |
| INTERLOCKING CONTROL | CONNECTION DESTINATION SERVICE C | https | FILE FORMAT A | CONNECTION DESTINATION ADDRESS E |
| DEMAND RESPONSE | CONNECTION DESTINATION SERVICE C | https | FILE FORMAT A | CONNECTION DESTINATION ADDRESS F |
| FAILURE PREDICTION | CONNECTION DESTINATION SERVICE D | | FILE FORMAT A | CONNECTION DESTINATION ADDRESS G |

FIG.6B

| SERVICE MENU | CONNECTION DESTINATION SERVICE | PROTOCOL | FILE FORMAT | CONNECTION DESTINATION ADDRESS |
|---|---|---|---|---|
| REMOTE MONITORING | CONNECTION DESTINATION SERVICE X | MQTT | FILE FORMAT B | CONNECTION DESTINATION ADDRESS X |
| REMOTE CONTROL | CONNECTION DESTINATION SERVICE X | MQTT | FILE FORMAT B | CONNECTION DESTINATION ADDRESS Y |
| ANOMALY DETECTION | CONNECTION DESTINATION SERVICE X | MQTT | FILE FORMAT B | CONNECTION DESTINATION ADDRESS Z |

COMMUNICATION APPARATUS, PROGRAM, COMMUNICATION METHOD, INFORMATION PROCESSING METHOD, INFORMATION PROCESSING APPARATUS, AND COMMUNICATION SYSTEM

TECHNICAL FIELD

The present invention relates to a communication device, a program, a communication method, an information processing method, an information processing device, and a communication system.

BACKGROUND ART

Conventionally, techniques for communicating with devices such as IoT (Internet of Things) using various communication protocols are known (see, for example, PTL 1).

CITATION LIST

Patent Literature

[PTL 1]
Japanese Laid-Open Patent Publication No. 2017-117445

SUMMARY OF INVENTION

Technical Problem

However, in the related art, there is a problem that, for example, a connection destination such as a server and the like that provides various services such as device monitoring may not be appropriately specified. The present disclosure is intended to provide a technique for connecting to an appropriate connection destination.

Solution to Problem

According to the first aspect of the present disclosure, a communication device includes: an acquiring unit configured to transmit first identification information for identifying the communication device to a first connection destination and to acquire information about a second connection destination corresponding to the first identification information; and a transmitter configured to transmit data to the second connection destination. Accordingly, it is possible to connect to an appropriate connection destination.

According to the second aspect of the present disclosure, the communication device of the first aspect, wherein, in a case where communication with the second connection destination is failed, the acquiring unit is configured to transmit the first identification information to the first connection destination and to acquire information about a third connection destination.

According to the third aspect of the present disclosure, the communication device of the first or second aspect, wherein the information about the second connection destination includes information about a communication protocol to be used for communication with the second connection destination, and wherein the transmitter is configured to transmit information that is acquired from a terminal connected via a first network to the second connection destination via a second network using the communication protocol.

According to the fourth aspect of the present disclosure, the communication device of any one of the first to third aspect, wherein the information about the second connection destination includes information about at least one of a communication protocol for each service according to a type of the communication device and about a communication address for each service according to the type of the communication device.

According to the fifth aspect of the present disclosure, the communication device of any one of the first to fourth aspect, wherein the information about the second connection destination includes information for specifying a data format of information to be sent to the second connection destination, and wherein the transmitter is configured to generate information about the data format and to transmit the generated information to the second connection destination.

According to the sixth aspect of the present disclosure, the communication device of any one of the first to fifth aspect, wherein the acquiring unit is configured to transmit a second identification information for identifying a property of the communication device, the property being set by an administrator, to the first connection destination and to acquire the information about the second connection destination associated with the second identification information.

According to the seventh aspect of the present disclosure, the communication device of any one of the first to sixth aspect, wherein the information about the second connection destination includes, for each priority level, information about a communication protocol to be used for communication with the second connection destination, and wherein, in a case where communication with the second connection destination using a communication protocol of a first priority level is failed, the transmitter is configured to transmit data to the second connection destination using a communication protocol of a second priority level.

According to the eighth aspect of the present disclosure, the communication device of any one of the first to seventh aspect, wherein the first identification information is set at a time of factory shipment of the communication device.

According to the ninth aspect of the present disclosure, the communication device of any one of the first to eighth aspect, wherein, in a case where authentication by the first connection destination based on information about an authentication status associated with the first identification information is successful, the acquiring unit is configured to acquire the information about the second connection destination from the first connection destination.

According to the tenth aspect of the present disclosure, the communication device of the ninth aspect, wherein the information about the authentication status is set in the first connection destination in a state associated with a second identification information for identifying a property of the communication device, the property being set by an administrator, and wherein the first identification information and the second identification information are set in the first connection destination in a state associated with each other by the administrator.

According to the eleventh aspect of the present disclosure, a program that causes a communication device to execute a process of: transmitting first identification information for identifying the communication device to a first connection destination and acquiring information about a second connection destination corresponding to the first identification information; and transmitting data to the second connection destination.

According to the twelfth aspect of the present disclosure, a communication method in which a communication device executes a process of: transmitting first identification information for identifying the communication device to a first connection destination and acquiring information about a second connection destination corresponding to the first identification information; and transmitting data to the second connection destination.

According to the thirteenth aspect of the present disclosure, an information processing method in which an information processing device executes a process of: receiving first identification information for identifying a communication device from the communication device via a second network; and transmitting information about a second connection destination to the communication device, the second connection destination being a destination to which pieces of data are sent from the communication device, the information about the second connection destination being information corresponding to the first identification information.

According to the fourteenth aspect of the present disclosure, an information processing device includes: a receiver configured to receive first identification information for identifying a communication device from the communication device via a second network; and a transmitter configured to transmit information about a second connection destination to the communication device, the second connection destination being a destination to which pieces of data are sent from the communication device, the information about the second connection destination being information corresponding to the first identification information.

According to the fifteenth aspect of the present disclosure, a program that causes an information processing device to execute a process of:
receiving first identification information for identifying a communication device from the communication device via a second network; and transmitting information about a second connection destination to the communication device, the second connection destination being a destination to which pieces of data are sent from the communication device, the information about the second connection destination being information corresponding to the first identification information.

According to the sixteenth aspect of the present disclosure, a communication system includes: a communication device; and an information processing device, wherein the communication device includes: an acquiring unit configured to transmit first identification information for identifying the communication device to a first connection destination and to acquire information about a second connection destination corresponding to the first identification information; and a transmitter configured to transmit data to the second connection destination, and wherein the information processing device includes:
a receiver configured to receive the first identification information for identifying the communication device from the communication device via a second network; and a transmitter configured to transmit the information about the second connection destination to the communication device, the second connection destination being a destination to which pieces of data are sent from the communication device, the information about the second connection destination being information corresponding to the first identification information.

BRIEF DESCRIPTION OF THE DRAWINGS

FIG. 5 is a diagram for explaining an example of information stored in a setting information DB according to an embodiment;

FIG. 6A is a diagram for explaining an example of connection destination information according to an embodiment; and FIG. 6B is a diagram for explaining an example of connection destination information according to an embodiment.

DESCRIPTION OF EMBODIMENTS

Figure 1:
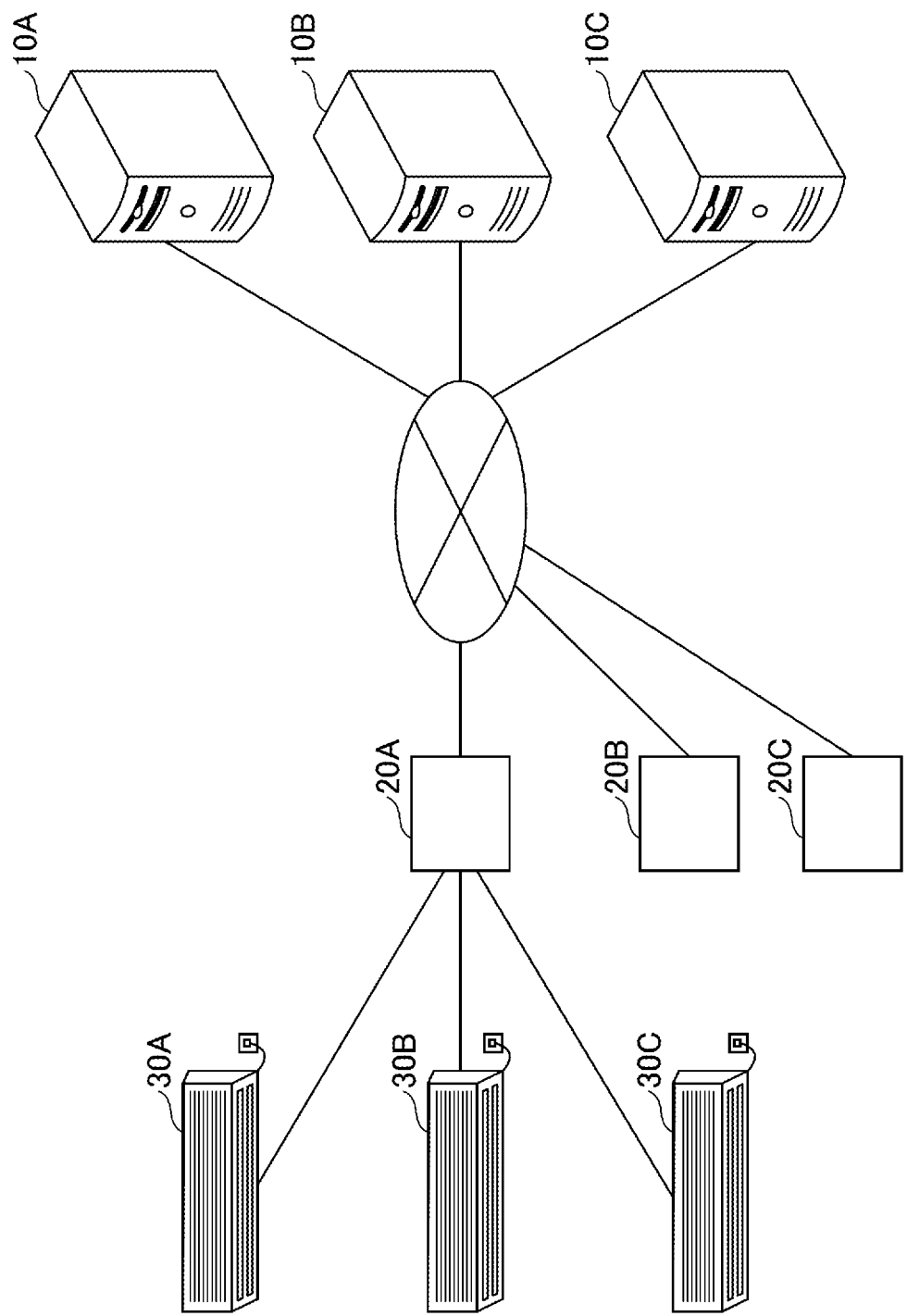
FIG. 1 is a diagram illustrating an example of a system configuration of a communication system according to an embodiment.

In the following, embodiments of the present invention will be described with reference to the drawings. In the present specification and the drawings, the components having substantially the same functional configuration are designated by the same reference numerals, and duplicate explanations are omitted.
<System Configuration>

First, a system configuration of a communication system 1 will be described. FIG. 1 is a diagram illustrating an example of a system configuration of the communication system 1 according to an embodiment. As illustrated in FIG. 1, the communication system 1 includes an information processing device 10A, an information processing device 10B, an information processing device 10C, and the like (Hereinafter, when it is not necessary to distinguish, it is simply referred to as an "information processing device 10"). The communication system 1 includes a communication device 20A, a communication device 20B, a communication device 20C, and the like (Hereinafter, when it is not necessary to distinguish, it is simply referred to as a "communication device 20"). The communication system 1 includes a device 30A, a device 30B, a device 30C, and the like (Hereinafter, when it is not necessary to distinguish, it is simply referred to as a "device 30"). The number of the information processing device 10, the communication device 20, and the device 30 is not limited to the example illustrated in FIG. 1.

The information processing device 10 and the communication device 20 may be connected so as to be able to communicate with each other via, for example, a network NW (an example of a "second network") such as the Internet, a wireless local area network (LAN), a mobile phone network, and the like. Examples of the mobile phone network may include a wireless communication system such as, for example, Long Term Evolution (LTE), 5th Generation Mobile Communication System (5G), and the like.

The information processing device 10 is a server that provides various services. The information processing device 10 may be, for example, a server that provides various services by cloud computing. The information processing device 10A serves as a server for notifying the communication device 20 with information about, for example, the information processing device 10B and the information processing device 10C that are connection destinations corresponding to the communication device 20.

The communication device 20 may be, for example, an edge installed in a facility (property, building) such as an apartment house, an office, a factory, and a public facility where the device 30 is installed. The communication device 20 may transmit information acquired from the device 30 to the information processing device 10 via, for example, a network such as a LAN of the facility (an example of a "first network"). The communication device 20 may transmit a command received, for example, from the information processing device 10 to the device 30.

Examples of the device 30 include an air conditioner, various sensors, and the like.

<Hardware Configuration of Information Processing Device 10 and Communication Device 20>

Figure 2:
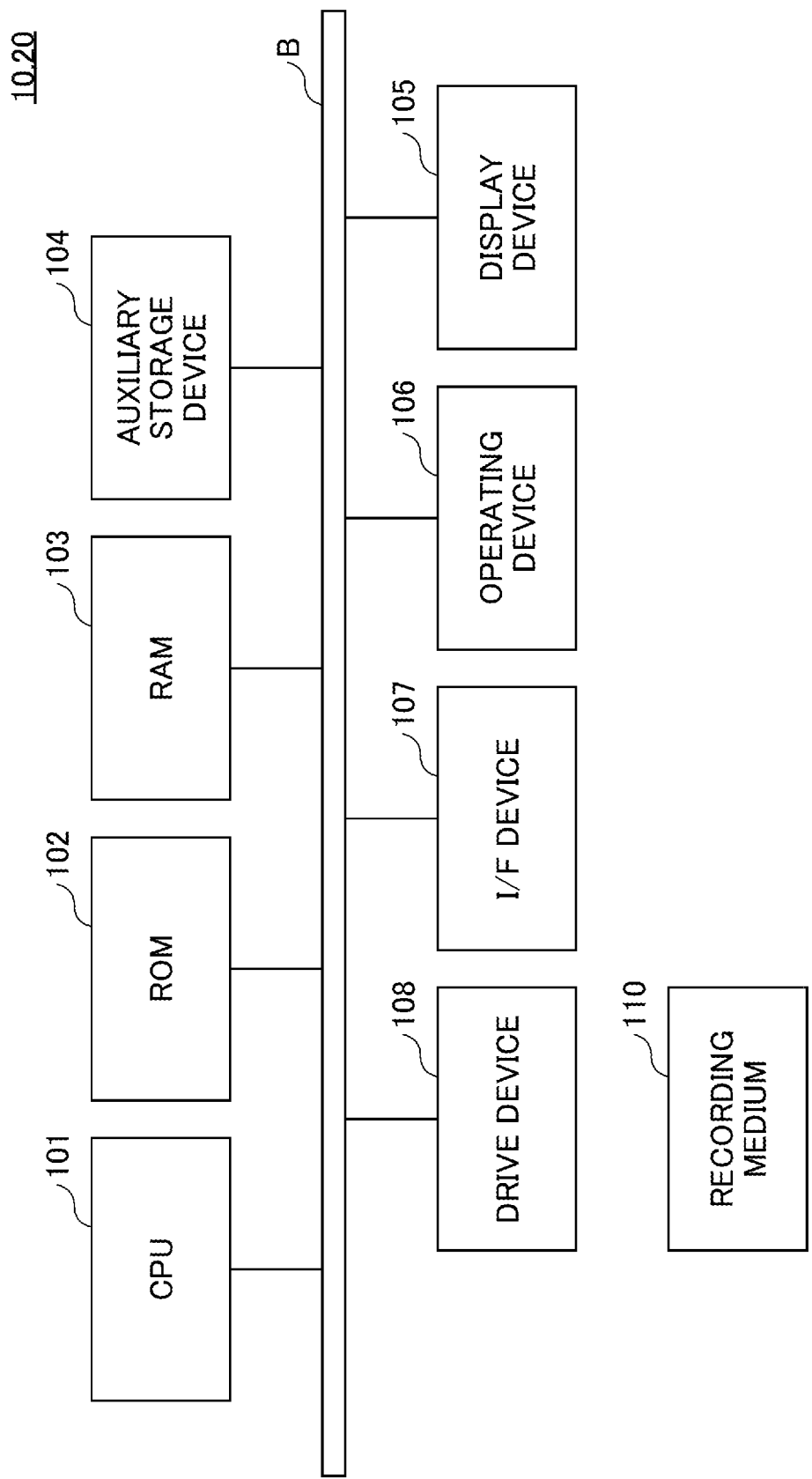
FIG. 2 is a diagram illustrating an example of a hardware configuration of an information processing device and a communication device according to an embodiment.

Next, a hardware configuration of the information processing device 10 and the communication device 20 of the communication system 1 according to an embodiment will be described. FIG. 2 is a diagram illustrating an example of a hardware configuration of the information processing device 10 and the communication device 20 according to an embodiment. Hereinafter, the information processing device 10 will be described as an example. The hardware configuration of the communication device 20 may be the same as the hardware configuration of the information processing device 10.

As illustrated in FIG. 2, the information processing device 10 includes a central processing unit (CPU) 101, a read-only memory (ROM) 102, and a random access memory (RAM) 103. The CPU 101, the ROM 102, and the RAM 103 constitute what is known as a computer. The information processing device 10 includes an auxiliary storage device 104, a display device 105, an operating device 106, an interface (I/F) device 107, and a drive device 108. The hardware components of the information processing device 10 are connected to each other via a bus B.

The CPU 101 is an arithmetic device that executes various programs (for example, a machine learning program and the like) installed in the auxiliary storage device 104. The ROM 102 is a non-volatile memory. The ROM 102 functions as a main storage device and stores various programs and data necessary for the CPU 101 to execute various programs installed in the auxiliary storage device 104. Specifically, the ROM 102 stores a boot program and the like such as Basic Input/Output System (BIOS), Extensible Firmware Interface (EFI), and the like.

The RAM 103 is a volatile memory such as Dynamic Random Access Memory (DRAM), Static Random Access Memory (SRAM), and the like. The RAM 103 functions as a main storage device and provides a work area in which various programs installed in the auxiliary storage device 104 are deployed when executed by the CPU 101.

The auxiliary storage device 104 stores various programs or information used when the various programs are executed.

The display device 105 is a display device for displaying a variety of information. The operating device 106 is an operating device for receiving various operations. The I/F device 107 is a communication device that communicates with an external device.

The drive device 108 is a device for setting a recording medium 110. The recording medium 110 herein includes a medium for optically, electrically, or magnetically recording information, such as a CD-ROM, a flexible disk, a magneto-optical disk, and the like. The recording medium 110 may include a semiconductor memory and the like that electrically records information, such as ROM, flash memory, and the like.

The various programs installed in the auxiliary storage device 104 are installed, for example, when the distributed recording medium 110 is set in the drive device 108 and various programs recorded in the recording medium 110 are read out by the drive device 108. Alternatively, various programs installed in the auxiliary storage device 104 may be installed by being downloaded from an unillustrated network.

The communication device 20 may include an I/F device 107A and an I/F device 107B (not illustrated) as a plurality of I/F devices 107. The I/F device 107A may be connected to a LAN and the like, and the I/F device 107B may be connected to the Internet and the like.

<Functional Configuration>

Figure 3:
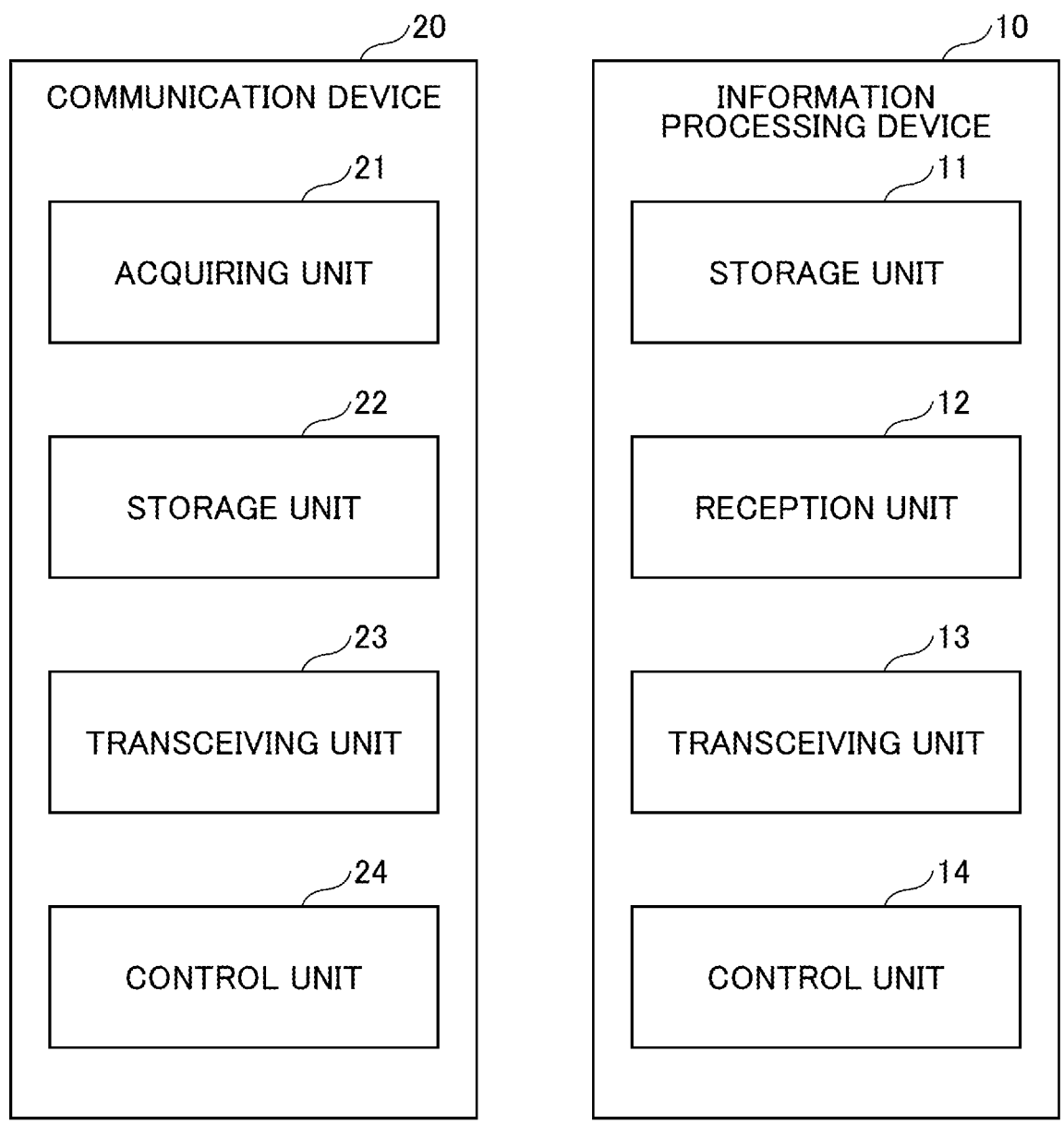
FIG. 3 is a diagram illustrating an example of a functional configuration of a communication system according to an embodiment.

Next, a functional configuration of the communication system 1 according to an embodiment will be described with reference to FIG. 3. FIG. 3 is a diagram illustrating an example of a functional configuration of a communication system according to an embodiment.

<<Information Processing Device 10>>

The information processing device 10 includes a storage unit 11, a reception unit 12, a transceiving unit 13, and a control unit 14. The components may be implemented, for example, by a collaboration between one or more programs installed in the information processing device 10 and hardware such as the CPU 101 of the information processing device 10.

The storage unit 11 stores various information. The reception unit 12 receives various operations from an administrator. The transceiving unit 13 communicates with the communication device 20. The control unit 14 controls each unit of the information processing device 10.

<<Communication Device 20>>

The communication device 20 includes an acquiring unit 21, a storage unit 22, a transceiving unit 23, and a control unit 24. For example, the components may be implemented, for example, by a collaboration between one or more programs installed in the communication device 20 and hardware such as a CPU of the communication device 20.

The acquiring unit 21 acquires connection destination information about the communication device 20 from the information processing device 10A. The storage unit 22 stores the connection destination information acquired by the acquiring unit 21.

The transceiving unit 23 communicates with the device 30 and the information processing device 10 according to the instruction of the control unit 24. The control unit 24 controls each unit of the communication device 20.

<Process>

Figure 4:
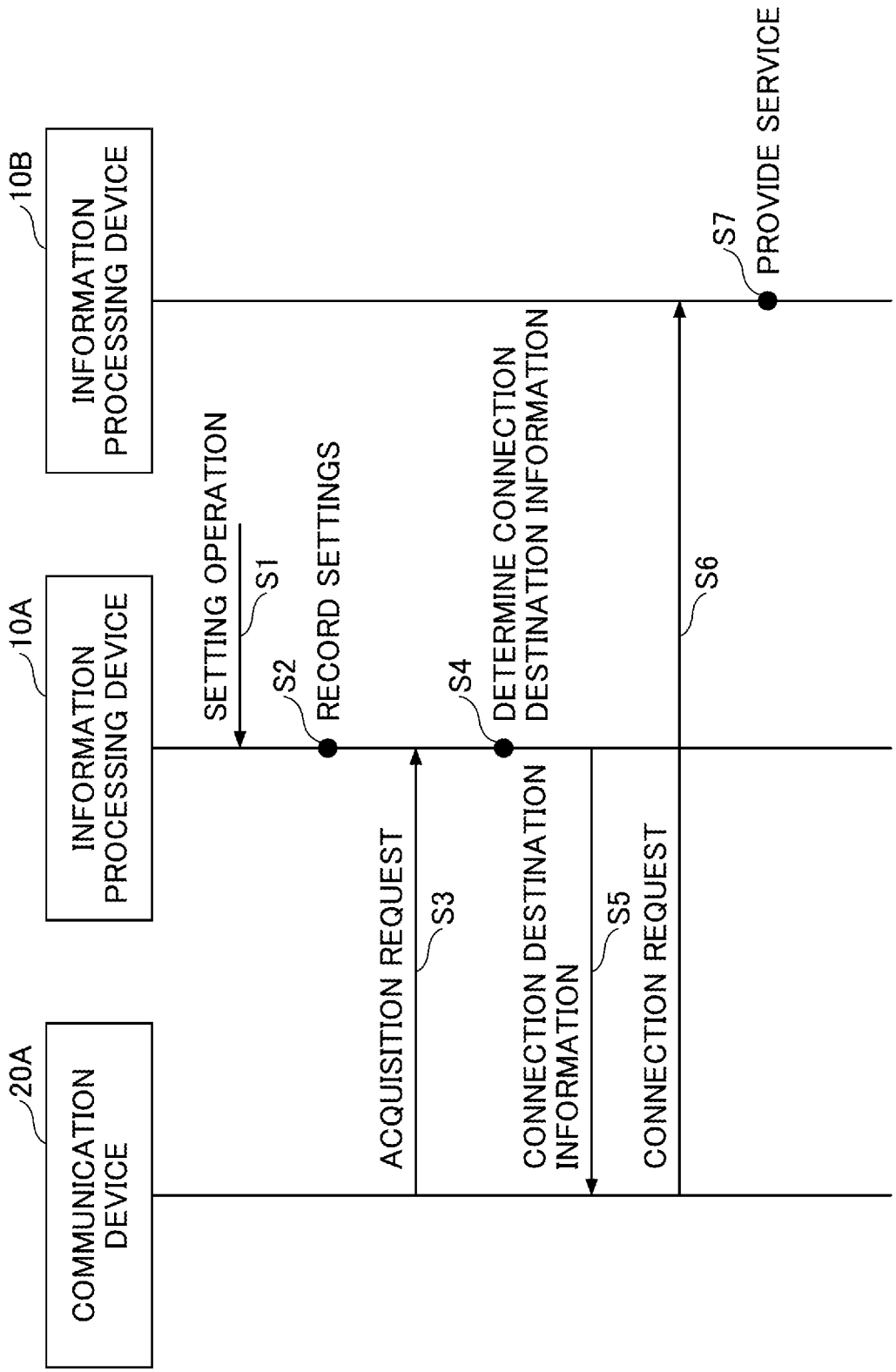
FIG. 4 is a flowchart illustrating an example of a process of the communication system according to an embodiment.

Next, an example of the process of the communication system 1 according to an embodiment will be described with reference to FIGS. 4 to 6B. FIG. 4 is a flowchart illustrating an example of a process of the communication system 1 according to an embodiment. FIG. 5 is a diagram for explaining an example of information stored in the setting information DB 111 according to an embodiment. FIGS. 6A and 6B are diagrams for explaining examples of connection destination information according to an embodiment.

In step S1, the information processing device 10A receives from the administrator settings of information about the communication device 20A installed in the facility A. Subsequently, the information processing device 10A records the received setting contents in the setting information DB 111 of the storage unit 11 (step S2). In the example of FIG. 5, in the setting information DB 111, a type (an example of a "property"), connection destination information, an authentication status, and a communication device ID are recorded in association with an edge ID (an example of "second identification information"). The edge ID is, for example, identification information for identifying the property of the communication device 20 installed in each facility. The edge ID may be, for example, identification information about the communication device 20 for each facility in which the communication device 20 is installed.

The type is a type of the communication device 20. Examples of the type of the communication device 20 may include type A in which, by a process of a predetermined program running on the communication device 20, processes such as control of the device 30 based on the information acquired from the various devices 30 and selection of the information to be transmitted to the information processing device 10 of the connection destination are performed. Examples of the type of the communication device 20 may include type B in which processes such as determination based on the information acquired from the various devices 30 are not performed, and only processes such as transmitting the information acquired from the various devices 30 to the information processing device 10 of the connection destination are performed.

The authentication status relates to authentication of the communication device 20. The authentication status may include, for example, a state such as "permitted" in which the use of the service by the communication device 20 is permitted, "prohibited" in which the use is prohibited, or the like.

The communication device ID is identification information about the communication device 20. The communication device ID may be recorded in, for example, the ROM and the like of the communication device 20 at the time of manufacturing (factory shipment) of the communication device 20. The communication device ID is an example of "first identification information".

The edge ID, the type, the connection destination information, and the authentication status may be registered in the setting information DB 111 by the operation of the administrator when designing a system configuration including, for example, the device 30 and the communication device 20 installed in each facility. The communication device ID may be registered in the setting information DB 111 in association with the edge ID by the operation of the administrator, for example, when the communication device 20 is installed in the facility.

The connection destination information is the connection destination information corresponding to the communication device 20. The connection destination information may be set according to the type of the communication device 20. FIGS. 6A and 6B illustrate examples of the connection destination information. FIG. 6A illustrates an example of the connection destination information for the communication device 20 of type A, and FIG. 6B illustrates an example of the connection destination information for the communication device 20 of type B. In the examples of FIGS. 6A and 6B, only the information about service menus that are permitted to be used for each communication device 20 is set.

In the examples of FIGS. 6A and 6B, the connection destination information includes a service menu, a connection destination service (a service of a connection destination cloud), a protocol, a file format (a data format), and a connection destination address.

The service menu is an item of service provided by the information processing device 10B and the like. The connection destination service is a service of the connection destination cloud used in the service provided by the information processing device 10B and the like. The protocol is a communication protocol to be used in the service provided by the information processing device 10B and the like. The file format is a format of data transmitted or received by the service provided by the information processing device 10B and the like. The connection destination address is a communication address of the information processing device 10B and the like that provides the service.

Subsequently, the communication device 20A transmits an acquisition request for the connection destination information to the information processing device 10A (an example of a "first connection destination") (step S3). Here, the communication device 20A transmits the acquisition request to a predetermined communication address of the information processing device 10A. The communication address of the information processing device 10A may be specified (hard-coded) in the source code of the program of the communication device 20A, for example. The communication address of the information processing device 10A may be recorded in an external ROM such as an Electrically Erasable Programmable Read-Only Memory (EEPROM) which can be rewritten by only an administrator, and the like, for example.

The acquisition request may include, for example, the communication device ID of the communication device 20A. The acquisition request may include, for example, the edge ID of the communication device 20A set by the administrator to the communication device 20A. The acquisition request may include, for example, authentication data of the communication device 20A. The authentication data may be, for example, data of a certificate (client certificate) installed in the communication device 20 at the time of factory shipment.

Subsequently, the information processing device 10A determines the connection destination information corresponding to the communication device 20A (step S4).

(Authentication Performed Based on Authentication Data)

Here, the information processing device 10A may first authenticate the communication device 20A based on the authentication data received from the communication device 20A. In this case, the information processing device 10A may authenticate the communication device 20A based on the communication device ID or the edge ID included in the received acquisition request and the authentication data. In this case, for example, when the pair of the communication device ID and the authentication data received from the communication device 20A matches with that registered in the storage unit 11, the information processing device 10A may determine that the authentication of the communication device 20A based on the authentication data is successful.

When the authentication of the communication device 20A based on the authentication data is unsuccessful, the information processing device 10A may send an error response indicating the authentication failure to the communication device 20A such that the subsequent processes are not performed. Authentication based on the authentication data is not essential.

(Authentication Performed Based on Authentication Status)

The information processing device 10A may perform authentication based on the authentication status associated with the communication device 20A. In this case, the information processing device 10A acquires the authentication status associated with the communication device 20A by referring to the setting information DB 111. In this case, for example, the information processing device 10A may acquire the communication device ID or the edge ID included in the received acquisition request and may acquire the authentication status stored in association with the acquired communication device ID or the edge ID from the setting information DB 111. When the authentication status associated with the communication device 20A is not "permitted", the information processing device 10A may send an error response representing the authentication status of the communication device 20A to the communication device 20A such that the subsequent processes are not performed. Authentication based on the authentication status is not essential.

(Determination of Connection Destination)

The information processing device 10A acquires the connection destination information associated with the communication device 20A by referring to the setting information DB 111. In this case, for example, the information processing device 10A may acquire the communication device ID or the edge ID included in the received acquisition request and may acquire the connection destination information stored in association with the acquired communication device ID or the edge ID from the setting information DB 111.

Accordingly, for example, the service of the connection destination cloud can be specified depending on the type of the communication device 20 or the communication device 20. In this case, for example, with respect to the communication device 20 of type A, a real-time data streaming service that has relatively high communication reliability, a relatively large communication data size between the communication device 20 and the information processing device 10B, and a relatively high usage cost of the cloud service, may be specified as the service of the connection destination cloud. For example, with respect to the communication device 20 of type B, an IoT service that has relatively low communication reliability because it is a best-effort type communication, a relatively small communication data size (M2M communication amount) between the communication device 20 and the information processing device 10B, and a relatively low usage cost of the cloud service, may be specified as the service of the connection destination cloud.

For example, a file format may be specified according to the communication device 20, the type of the communication device 20, or the like. In this case, for example, with respect to the communication device 20 of type A, a JavaScript (registered trademark) Object Notation (Json) format, which is relatively easy to maintain because of its high readability, and has a relatively large communication data size between the communication device 20, the information processing device 10B, and the like, may be specified. For example, with respect to the communication device 20 of type B, a key-value format, which has a relatively small communication data size between the communication device 20, the information processing device 10B, and the like, may be specified.

For example, the connection destination address of the communication device 20 may be specified according to the location such as the country or region where the communication device 20 is installed. Accordingly, for example, the communication device 20 can be connected to the information processing device 10B and the like that is geographically closest to the place where the communication device 20 is installed. Further, the communication device 20 can be connected to the appropriate information processing device 10B and the like based on the legal constraints and the like of the country or region where the communication device 20 is installed.

For example, a communication protocol of the communication device 20 can be specified, according to the facility in which the communication device 20 is installed. Accordingly, for example, when communication packets such as Message Queuing Telemetry Transport (MQTT) are blocked by the firewall and the like of the facility, communication with Hypertext Transfer Protocol (HTTP) and the like can be performed.

Subsequently, the information processing device 10A transmits the determined connection destination information to the communication device 20A (step S5). For example, when the connection destination information associated with the communication device 20A in the setting information DB 111 is updated by an operation of the administrator, the information processing device 10A may transmit the updated connection destination information to the communication device 20A. In this case, the information processing device 10A may maintain the connection of the communication session with the communication device 20A by communication of, for example, WebSocket and the like, and may notify the communication device 20A of the updated connection destination information by using the communication session.

Subsequently, the communication device 20A transmits a connection request to the information processing device 10B and the like (an example of a "second connection destination"), which is the specified connection destination (step S6). For example, the communication device 20A may transmit the connection request to the specified connection destination address using the communication protocol specified by the connection destination information received from the information processing device 10A.

(Determination of Communication Protocol According to Installation Environment)

The connection destination information transmitted from the information processing device 10A to the communication device 20A may include, for each priority level, information about the communication protocol to be used for communication with the information processing device 10B and the like. When the communication device 20 fails to communicate with the connection destination using the communication protocol of a first priority level, the communication device 20 may transmit data using the communication protocol of a second priority level. Accordingly, for example, when a communication packet such as MQTT is interrupted by a firewall and the like of a facility in which the communication device 20A is installed, communication over an HTTP and the like can be performed.

In this case, when the response from the information processing device 10B and the like to the request transmitted to the information processing device 10B and the like using the communication protocol of a first priority level is not received within a predetermined time, the communication device 20 may determine that communication in the communication protocol has failed.

(Updating of Connection Destination Information)

When the communication device 20 has failed to communicate with the connection destination specified by the information processing device 10A, the communication device 20 may perform the process in step S3 again to acquire the information about the connection destination again. Accordingly, for example, when the operation of the old server is stopped and the like, the communication device 20 can acquire information about the new server.

Subsequently, the information processing device 10B provides a predetermined service to the communication device 20A (step S7). For example, the communication device 20A may generate, based on the data collected from the device 30, data of a file format specified by the connection destination information received from the information processing device 10A and may transmit the generated data to the information processing device 10B.

For example, the information processing device 10B may provide a service to the administrator and the like based on the data of the device 30 received from the communication device 20A. The service include remote monitoring of the device 30, schedule control for remotely controlling the device 30 according to a predetermined schedule, interconnect control for interconnecting control of the device 30B when the device 30A is operated and the like by a user, and the like.

<Variation>

Each functional unit of the information processing device 10 and the communication device 20 may be implemented by, for example, cloud computing executed by one or more computers.

While the embodiments have been described above, it will be understood that various modifications of the embodiments and details may be made without departing from the spirit and scope of the claims.

Although the present invention has been described above based on the examples, the invention is not limited to the above examples, and various modifications can be made within the scope of the claims.

The present application claims priority to Japanese Patent Application No. 2020-035381, filed Mar. 2, 2020, with the Japanese Patent Office. The contents of which are incorporated herein by reference in their entirety.

DESCRIPTION OF THE REFERENCE NUMERAL

1 Communication system
10 Information processing device
11 Storage unit
111 Setting information DB
12 Reception unit
13 Transceiving unit
14 Control unit
20 Communication device
21 Acquiring unit
22 Storage unit
23 Transceiving unit
24 Control unit
30 Device

The invention claimed is:

1. A communication device comprising:
a processor; and
a memory storing program instructions that cause the processor to:
transmit first identification information for identifying the communication device to a first connection destination and to acquire information about a second connection destination, a communication protocol to be used for communication with the second connection destination, and information for specifying a data format of information to be sent to the second connection destination, that are corresponding to the first identification information; and
acquire information about a communication protocol for each service of a plurality of services according to a type of the communication device and about a communication address for each service of the plurality of services according to the type of the communication device; and
a transmitter configured to:
generate, in a case where a first data format is specified by the first connection destination, a second data of the first data format based on a first data acquired from a terminal connected via a first network, and transmit the second data using the communication protocol to the second connection destination via a second network; and
generate, in a case where a second data format is specified by the first connection destination, a third data of the second data format based on the first data, and transmit the third data using the communication protocol to the second connection destination via the second network.

2. The communication device according to claim 1, wherein, in a case where communication with the second connection destination is unsuccessful, the program instructions cause the processor to transmit the first identification information to the first connection destination and to acquire information about a third connection destination.

3. The communication device according to claim 1, wherein the program instructions cause the processor to transmit a second identification information for identifying a property of the communication device, the property being set by an administrator, to the first connection destination and to acquire the information about the second connection destination associated with the second identification information.

4. The communication device according to claim 1,
wherein the program instructions cause the processor to acquire, for each priority level of a plurality of priority levels, the information about the communication protocol to be used for communication with the second connection destination, and
wherein, in a case where communication with the second connection destination using a communication protocol of a first priority level is unsuccessful, the transmitter is configured to transmit data to the second connection destination using a communication protocol of a second priority level.

5. The communication device according to claim 1, wherein the first identification information is set at a time of factory shipment of the communication device.

6. The communication device according to claim 1, wherein, in a case where authentication by the first connection destination based on information about an authentication status associated with the first identification information is successful, the program instructions cause the processor to acquire the information about the second connection destination from the first connection destination.

7. The communication device according to claim 6,
wherein the information about the authentication status is set in the first connection destination in a state associated with a second identification information for identifying a property of the communication device, the property being set by an administrator, and
wherein the first identification information and the second identification information are set in the first connection destination in a state associated with each other by the administrator.

8. A non-transitory computer-readable recording medium storing a program that causes a communication device to execute a process of:
transmitting first identification information for identifying the communication device to a first connection destination and acquiring information about a second connection destination, a communication protocol to be used for communication with the second connection destination, and information for specifying a data format of information to be sent to the second connection destination, that are corresponding to the first identification information; and acquiring information about a communication protocol for each service of a plurality of services according to a type of the communication device and about a communication address for each service of the plurality of services according to the type of the communication device; and generating, in a case where a first data format is specified by the first connection destination, a second data of the first data format based on a first data acquired from a terminal connected via a first network, and transmitting the second data using the communication protocol to the second connection destination via a second network; and generating, in a case where a second data format is specified by the first connection destination, a third data of the second data format based on the first data, and transmitting the third data using the communication protocol to the second connection destination via the second network.

9. A communication method in which a communication device executes a process of:

transmitting first identification information for identifying the communication device to a first connection destination and acquiring information about a second connection destination, a communication protocol to be used for communication with the second connection destination, and information for specifying a data format of information to be sent to the second connection destination, that are corresponding to the first identification information; and acquiring information about a communication protocol for each service of a plurality of services according to a type of the communication device and about a communication address for each service of the plurality of services according to the type of the communication device; and generating, in a case where a first data format is specified by the first connection destination, a second data of the first data format based on a first data acquired from a terminal connected via a first network, and transmitting the second data using the communication protocol to the second connection destination via a second network; and generating, in a case where a second data format is specified by the first connection destination, a third data of the second data format based on the first data, and transmitting the third data using the communication protocol to the second connection destination via the second network.

10. A communication system comprising:
a communication device; and
an information processing device,
wherein the communication device includes:
a processor; and
a memory storing program instructions that cause the processor to:
transmit first identification information for identifying the communication device to a first connection destination and to acquire information about a second connection destination, a communication protocol to be used for communication with the second connection destination, and information for specifying a data format of information to be sent to the second connection destination, that are corresponding to the first identification information; and acquire information about a communication protocol for each service of a plurality of services according to a type of the communication device and about a communication address for each service of the plurality of services according to the type of the communication device; and a first transmitter configured to:
generate, in a case where a first data format is specified by the first connection destination, a second data of the first data format based on a first data acquired from a terminal connected via a first network, and transmit the second data using the communication protocol to the second connection destination via a second network; and generate, in a case where a second data format is specified by the first connection destination, a third data of the second data format based on the first data, and transmit the third data using the communication protocol to the second connection destination via the second network, and wherein the information processing device includes:
a receiver configured to receive the first identification information for identifying the communication device from the communication device via the second network; and a second transmitter configured to transmit the information about the second connection destination to the communication device, the second connection destination being a destination to which pieces of data are sent from the communication device, the information about the second connection destination being information corresponding to the first identification information, and information for specifying a data format of information to be sent to the second connection destination.

* * * * *